(12) United States Patent
Sacher et al.

(10) Patent No.: US 7,609,393 B2
(45) Date of Patent: Oct. 27, 2009

(54) FILLING TEST METHOD AND DEVICE

(75) Inventors: Dirk Sacher, Wentorf (DE); Ralf Heikens, Wentorf (DE); Matthias Horn, Ahrensburg (DE)

(73) Assignee: Hauni Maschinenbau AG, Hamburg (DE)

( * ) Notice: Subject to any disclaimer, the term of this patent is extended or adjusted under 35 U.S.C. 154(b) by 497 days.

(21) Appl. No.: 11/437,741

(22) Filed: May 22, 2006

(65) Prior Publication Data
US 2006/0262293 A1 Nov. 23, 2006

(30) Foreign Application Priority Data
May 23, 2005   (DE) ................. 10 2005 024 126

(51) Int. Cl.
*G01B 11/14* (2006.01)
*G01N 21/55* (2006.01)
(52) U.S. Cl. ................. 356/614; 356/634; 356/635; 356/445
(58) Field of Classification Search ........................ None
See application file for complete search history.

(56) References Cited

U.S. PATENT DOCUMENTS

| 4,710,066 | A | 12/1987 | Kageler et al. |
| 4,976,544 | A | 12/1990 | Neri |
| 6,226,078 | B1 | 5/2001 | Focke et al. |
| 6,531,693 | B1 * | 3/2003 | Focke et al. .................. 250/221 |

FOREIGN PATENT DOCUMENTS

| DE | 35 38 660 | 5/1986 |
| DE | 39 20 888 | 1/1990 |
| DE | 4339441 | 5/1995 |
| DE | 19622995 | 12/1997 |
| DE | 197 45 813 | 4/1999 |
| DE | 19753333 | 6/1999 |
| DE | 198 17 824 | 10/1999 |
| DE | 19945808 | 3/2001 |
| GB | 2289206 | 11/1995 |
| JP | HEI-11-107178 | 4/1990 |
| JP | HEI-11-337501 | 12/1999 |

OTHER PUBLICATIONS

Article "Optische Messverfahren im Vergleich- Abstandsmessung prinzipiell beleuchtet" by Jörg Beintner, IEE p. 58, 2002.
English Language Abstract of DE 197 45 813.
English Language Abstract of DE 35 38 660.

* cited by examiner

*Primary Examiner*—Gregory J Toatley, Jr.
*Assistant Examiner*—Amanda H Merlino
(74) *Attorney, Agent, or Firm*—Greenblum & Bernstein, P.L.C.

(57) ABSTRACT

Method for testing the filling of a container with rod-shaped articles of the tobacco-processing industry and filling test device for the container, in which a depth of the container is at least as great as a length of a rod-shaped article. The process includes detecting at least one property of the content of the container, comparing the at least one property with a predetermined desired content of the container, and when a deviation from the desired content is greater than a predetermined tolerance value, generating a signal corresponding to a defective filling. The instant abstract is neither intended to define the invention disclosed in this specification nor intended to limit the scope of the invention in any way.

28 Claims, 10 Drawing Sheets

FILLING TEST METHOD AND DEVICE

CROSS-REFERENCE TO RELATED APPLICATIONS

The present application claims priority under 35 U.S.C. §119 of German Patent Application No. 10 2005 024 126.3, filed on May 23, 2005, the disclosure of which is expressly incorporated by reference herein in its entirety.

BACKGROUND OF THE INVENTION

1. Field of the Invention

The invention relates to a method for testing the filling of a container and a filling test device for containers of the tobacco-processing industry.

2. Discussion of Background Information

The handling of rod-shaped objects or articles in the tobacco-processing industry is often implemented with containers or trays. The rising increase in the production speed of cigarette and filter manufacturing machines is less and less consistent with manual handling of the trays filled with product rods. As a rule, a tray is filled with approx. 4,000 product rods. With product speeds of, e.g., 16,000 produced cigarettes per minute, this can mean up to four tray exchanges per minute and thus a movement of respectively up to four full and four empty trays at one production machine. An operator thus would have only 7.5 seconds to perform the tray transport of full and empty trays.

It can happen that full or empty trays exhibit filling or emptying errors which, in the case of manual handling, an operator would be able to recognize and correct. The failure to correct these errors would consequently lead to process defects, which can result in a production stoppage, e.g., of a cigarette-making machine.

An efficient method and an efficient device for the successive emptying of containers are known from DE 199 45 808 A1.

SUMMARY OF THE INVENTION

The present invention provides a method for testing the filling of a container with rod-shaped articles of the tobacco-processing industry and a filling test device for containers for receiving rod-shaped articles of the tobacco-processing industry, by which a continuous filling of a machine of the tobacco-processing industry with rod-shaped articles is rendered possible.

According to the invention, the method for testing the filling of a container with rod-shaped articles of the tobacco-processing industry, in which a depth of the container is at least as great as a length of a rod-shaped article includes detecting at least one property of the content of the container, and comparing the at least one property with in particular a predetermined desired content of the container. Further, when a deviation from the desired content is greater than in particular a predetermined tolerance value, a signal is generated that corresponds to a defective filling.

According to the invention, one property of the content of a container can hereby be a filling with rod-shaped articles of the tobacco-processing industry which has taken place uniformly row by row. One property can also be a uniform depth of the filling or a uniform height. One property can also be that articles are filled irregularly, which can lead to breakdowns in the subsequent production process. When a signal is generated that corresponds to a faulty filling, the container can be excluded from the further production process and subsequently, e.g., be tipped out or changed by an operator to an orderly filling or to a desired content of the container. One property of a content of a container can also be that no article is contained in the container. This corresponds to a complete emptying.

The fill level of the container is preferably detected from above the articles. Furthermore, preferably the topmost layer of the articles is tested for articles positioned crosswise or the topmost layers. In the first case, the property of the content of the container is a measured height of the articles in the container, which height is compared to a desired height or the height of a desired content of the container. The height can hereby vary across the width of the container. In the second case, the property is the content of the container that the topmost layer of the articles is oriented identically or that at least one article is aligned crosswise to this otherwise identical orientation.

Preferably before the detection of the topmost layer or topmost layers of the content of the container, the container is somewhat tilted. Through the tilting of the container, articles positioned obliquely or crosswise can roll to the lower side wall of the container so that a detection of the property of the content of the container must take place only at this point. The tilting occurs hereby such that articles positioned crosswise to a side wall of the container, which sidewall extends over the entire width of the container, can occur.

Preferably articles projecting from the content of the container are detected. These can be detected in the overall content of the container over the entire width and the entire height of the container.

Furthermore, preferably articles remaining in the container after the container has been emptied are detected.

A very quick method is possible when an optical image is recorded by a camera and compared to a desired image. Conducting the process is even quicker when a line orientation is recorded by a contrast image. In this case, for example, it can be recognized very quickly whether an article of the topmost layer or the layer second from the top, i.e., the layers visible from above, is positioned crosswise.

A very cost-effective solution is possible when, by a sensor, in particular a probe, such as an ultrasonic probe or an optical probe, a signal pattern is detected over the width of the container and compared to a stored signal pattern or another detected signal pattern. The other signal pattern can then be generated by the same probe or sensor which, however, at a different location, e.g., displaced downwards, generates a signal pattern across the entire width of the container. However, further sensors or probes such as a second and a third sensor can also detect signal patterns at different depths of the container across the width in a parallel manner so that they can be compared to one another. Preferably, these are laser reflex probes. The comparison can also be made in that different measured signals or signal patterns are compared or subtracted from one another and, in the event of a deviation that is greater than a predetermined tolerance value, a signal is generated that corresponds to a faulty filling.

Preferably at least one laser distance sensor is used. Reference is hereby made to the article "Optische Messverfahren im Vergleich—Abstandsmessung prinzipiell beleuchtet," Jörg Beintner, IEE p. 58, 2002.

In particular the laser distance sensor can function according to the principle of laser triangulation. The laser distance sensor can also function according to the principle of laser light section known per se. Preferably laser distance sensors of the LAA . . . type by di-soric Industrie-electronic GmbH & Co., D 73660 Urbach, Germany, are used.

Preferably, the laser distance sensor picks up a signal pattern across the width of the container. This is preferably a height profile. When two laser distance sensors are provided, which are arranged next to one another essentially perpendicular to the width of the container, such that the distances detected with the laser distance sensors at predetermined times are subtracted from one another, a very efficient and reliable method operation is possible.

Preferably, the sensor or the sensors are moved across the width of the container or the container moves through a detection area of the sensor or sensors. The movement is hereby preferably crosswise to the depth and parallel to the width of the container. The movement can be used hereby that is performed with the container anyway during a filling or emptying of a corresponding machine of the tobacco-processing industry. In this respect, for example, reference is made to DE 196 22 995 A1, in which crosswise to the depth of the tray or container, it is moved in a tray container. With this movement a signal pattern can be generated accordingly.

Further, the invention relates to a filling test device for containers for receiving rod-shaped articles of the tobacco-processing industry with a device for recording (recording device) at least one property of the content of the container and with an evaluation device. The evaluation device is embodied in order to compare the at least one property of the content of the container to a desired content of the container, whereby the evaluation device comprises a signal generation unit that is embodied to generate an error signal when a deviation from the desired content is present and greater than in particular a predetermined tolerance value.

A very efficient monitoring of the filling of a container with rod-shaped articles is possible through the filling test device according to the invention, such that a continuous filling of a machine of the tobacco-processing industry with rod-shaped articles is rendered possible. One property of the content of the container can be a uniform filling with rod-shaped articles of the tobacco-processing industry or also a non-uniform filling. In this context, reference is also made in particular to the above-mentioned properties of the content of a container. When preferably at least one camera is provided as a recording device for recording at least one section of the front view and/or at least one section of the plan view of the container or the rod-shaped articles located in the container, a very quick and efficient monitoring of the filling of the container is possible.

When a single camera is used, a very quick monitoring is possible. In this case a single image or two or more partial images per container can be recorded by the camera, which can be evaluated respectively. In the case of two or more images, it is expedient for the camera or the container to be embodied to be movable. An array of cameras can also be provided, the images of which are assembled to provide an overall image or the images of which are monitored individually for a correct filling of the containers or the images of which can be used for this monitoring. The comparison of a property of the content of the container to a desired content of the container can occur by comparing the recorded property to a stored property. However, this can also occur by comparing structures in the recorded image or by a gray-scale comparison of the recorded pixels of the image or the like.

The recording device preferably comprises a photo line, whereby the photo line and/or the container is or are moveable.

Preferably the recording device comprises at least one sensor by which a signal pattern can be recorded along the width of the container, which pattern can be compared to a stored signal pattern or a second signal pattern recorded by the sensor or by a second sensor in an evaluation device.

A very efficient device is given when the sensor or the sensors is or are moveable on a carriage essentially parallel to the width of the container. If the sensor or the sensors are moveable crosswise to the travel direction, a very precise filling test device can be realized. The sensor is preferably a distance sensor, in particular a laser distance sensor.

The sensor is preferably a probe, in particular a reflective probe, laser reflex probe or ultrasonic probe. Within the scope of this invention, a probe can be a passive component that, e g., records different brightnesses, as well as an active element that first emits light or ultrasound and measures the reflected light or the reflected ultrasound.

The sensor is preferably an optical camera. By the camera, it is possible in a particularly efficient and simple manner to produce a line orientation of a contrast image and to compare it to a stored contrast image. A higher focus depth is possible when an illumination is provided that illuminates the topmost layer or the topmost layers of the articles in the container obliquely to the longitudinal axis of the articles or obliquely to the depth of the container.

Rods positioned crosswise can be detected particularly effectively when a container tipping device is provided.

The present invention is directed to a method for testing the filling of a container with rod-shaped articles of the tobacco-processing industry, in which a depth of the container is at least as great as a length of a rod-shaped article. The process includes detecting at least one property of the content of the container, comparing the at least one property with a predetermined desired content of the container, and when a deviation from the desired content is greater than a predetermined tolerance value, generating a signal corresponding to a defective filling.

According to a feature of the invention, the at least one property can be a fullness level of the container, and the process may further includes detecting the fullness level of the container from above the articles.

At least one upper layer of the articles in the container can be tested for articles positioned crosswise. Further, before the detection of the at least one upper layer of the articles in the container, the container can be tilted.

In accordance with another feature of the invention, at least one upper layer of the articles in the container may be tested for articles positioned obliquely to an intended orientation.

According to another feature of the present invention, portions of articles projecting from the content of the container may be detected.

Moreover, articles remaining in the container after the container has been emptied can be detected.

In accordance with still another feature of the instant invention, the detecting may include recording an optical image by camera, and the comparing may include comparing the optical image to a desired image.

Further, the detecting can include recording a line orientation by a contrast image.

According to the invention, the detecting may include detecting a signal pattern over a width of the container, and the comparing can include comparing the signal pattern with one of a stored signal pattern or another detected signal pattern. Further, the signal pattern can be detected by a sensor and/or the signal pattern may be detected by one of an ultrasonic probe and an optical probe.

According to a further feature of the invention, at least one laser distance sensor may be used, such that the laser distance sensor can record a signal pattern across a width of the container. Further, the at least one laser distance sensor may include two laser distance sensors arranged next to one another to be essentially perpendicular to a width of the container, and the process can further include subtracting the distances detected with the laser distance sensors at predetermined times from one another.

Moreover, at least one sensor can move relative to the container. In this regard, the at least one sensor may move across a width of the container and/or the container can move through a detection zone of the at least one sensor.

The present invention is directed to a filling test device for containers for receiving rod-shaped articles of the tobacco-processing industry. The filling test device includes a recording device for recording at least one property of a content of the container, and an evaluation device including a signal generator unit. The evaluation device is structured and arranged to compare the at least one property of the content of the container with a desired content of the container, and the signal generation unit is structured and arranged to generate an error signal when a deviation from the desired content is present and greater than a predetermined tolerance value.

In accordance with a feature of the invention, the recording device may include at least one camera structured and arranged to record at least one of: at least one section of a front, top, or plan view of the container and the rod-shaped articles located in the container.

According to another feature of the invention, the recording device can include a photo line, and at least one of the photo line and the container can be structured and arranged to be moveable.

Moreover, the recording device can include at least one sensor structured and arranged to record a signal pattern along at least one of a width and a height of the container, and evaluation device may include a storage device to store at least one signal pattern to be compared to recorded the signal pattern. The at least one sensor can be moveable on a carriage arranged essentially parallel to the width of the container. Further, the at least one sensor may be movable crosswise to the travel direction. The at least one sensor can include a distance sensor, which may include a laser distance sensor. Further, the at least one sensor can include one of a reflective probe, laser reflex probe or an ultrasonic probe. The at least one sensor may also include an optical camera.

In accordance with still yet another feature of the present invention, the filling test device can include a container tipping device.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 6a illustrates a diagrammatic side view of a tray;

FIG. 6b illustrates a diagrammatic representation of a signal over time diagram;

FIG. 6c illustrates a diagrammatic side view of the tray from FIG. 6a;

FIG. 7a illustrates a diagrammatic plan view of a part of a tray;

FIG. 7b illustrates a diagrammatic signal over time diagram;

FIG. 7c illustrates a diagrammatic sectional representation along the section A-A from FIG. 7a;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figures 1, 2:
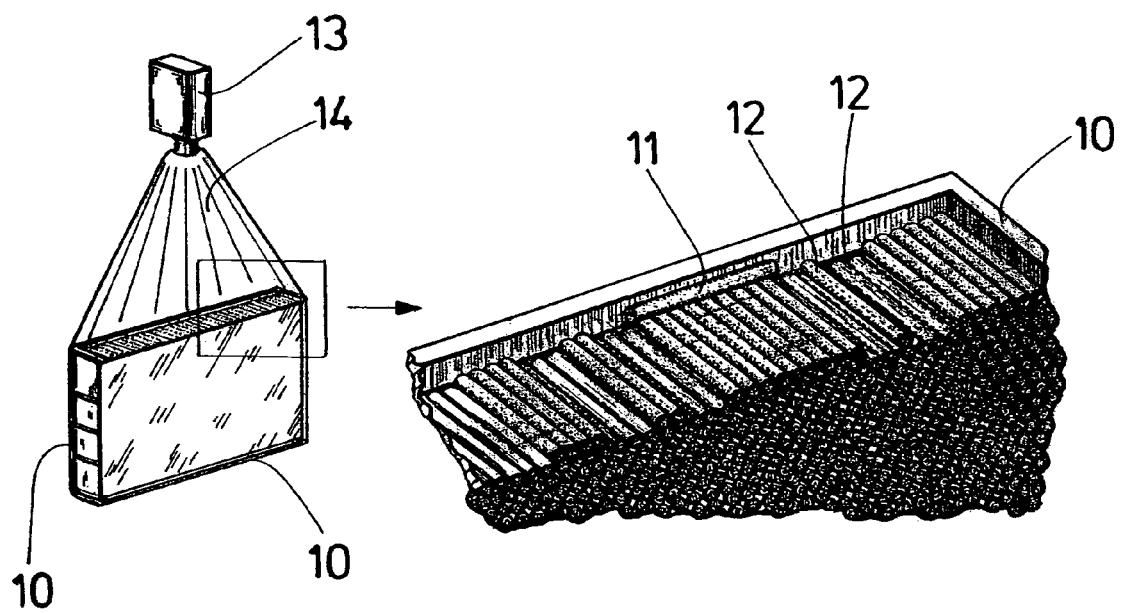
FIG. 1 illustrates a diagrammatical three-dimensional representation of a filling test device according to the invention.
FIG. 2 illustrates a diagrammatic three-dimensional representation of the section from FIG. 1.

FIG. 1 shows a diagrammatic three-dimensional representation of a filling test device according to the invention in a first embodiment. A tray 10 is filled with filter rods 11, 12, which are shown more clearly in FIG. 2, since FIG. 2 is a sectional enlargement from FIG. 1. A camera 13 that takes an image in a detection zone 14 of the tray surface or of the filter rods 11 and 12 located in the tray 10, is located above the tray 10. The evaluation of the image occurs via a program that compares, e.g., the line orientation of a contrast image. If cigarettes or filters 11, 12 are in a deviating orientation, they are recognized and the tray 10 is identified as non-conforming. The advantage of the filling test device according to the invention according to FIGS. 1 and 2 is a quick evaluation and an installation in a machine of the tobacco-processing industry possible almost everywhere. Moreover, the values for identifying non-conformity can be individually adjusted and the test can take place when the tray 10 is stopped.

Figure 3:
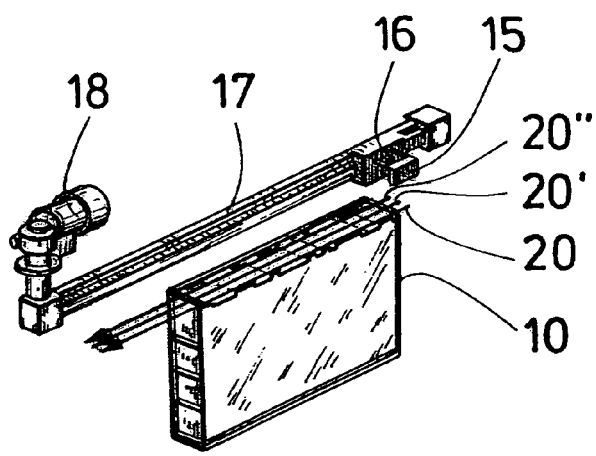
FIG. 3 illustrates a diagrammatic three-dimensional representation of another embodiment of a filling test device according to the invention.

FIG. 3 shows a diagrammatic three-dimensional representation of another embodiment of a filling test device according to the invention. In this case, too, a tray 10 is filled with corresponding rod-shaped articles such as, e.g., filter rods 11 and 12 or cigarettes. In this case a sensor 15 is provided that scans the topmost layers of the tray to be tested. The sensor 15 thereby moves relative to the tray 10, whereby it is irrelevant whether the tray 10 or the sensor 15 moves. There are several possibilities for recognizing a non-conforming tray 10 with the aid of a sensor 15 or several sensors, one variant of which is shown in FIG. 3. In this method the sensor 15 moves once or several times in offset tracks 20, 20', 20" or corresponding travel paths 20, 20', 20" over the upper layers of the rod-shaped articles. A program that is carried out in an evaluation unit (not shown), compares either the signal pattern to a predetermined pattern or the pattern of the offset tracks to one another. If the filter rods 10 and 11 are not in the desired orientation, the signal patterns deviate one from the other and from the predetermined pattern. In the case of a deviation that is greater than a predetermined tolerance value, the non-conforming tray is recognized. The process reliability is lower with only one track than with the method with several tracks.

Figure 4:
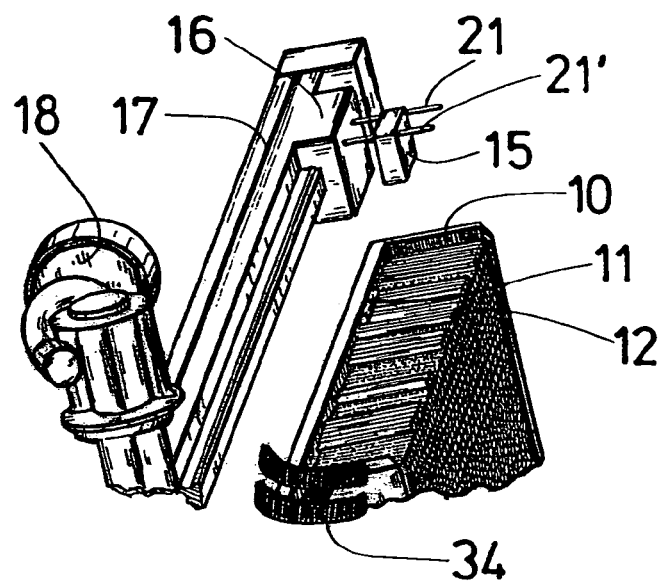
FIG. 4 illustrates a diagrammatic three-dimensional representation of another filling test device according to the invention.

FIG. 4 shows another variant according to the invention of a filling test device according to the invention in a diagrammatic three-dimensional representation. Here, too, a carriage 16 is moved by a motor 18 via a rail 17 along the width of the tray 10. A sensor 15 is provided on the carriage 16, which is supported in a moveable manner on the rails 21 and 21' crosswise to the width of the tray, i.e., in the depth of the tray 10.

Furthermore, a container tipping device 34 is provided, by which the tray 10 can be somewhat tipped accordingly, so that the article 11 can roll to the rear wall of the tray 10. In this case it is necessary merely for the sensor 15 to be moved in an area of the rear wall of the tray 10 in a track above the tray 10 along the width, so that the filter rod 11 positioned crosswise can be recognized by a sensor and a movement. In this case, too, alternatively the tray 10 can be moved under a fixed sensor 15. In FIG. 4 the container tipping device is indicated only diagrammatically.

Figure 5:
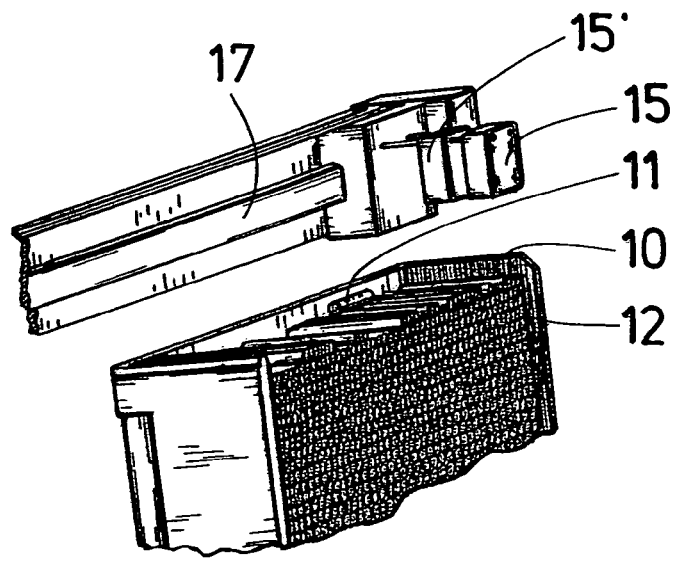
FIG. 5 illustrates a diagrammatic three-dimensional representation of a part of another embodiment according to the invention.

FIG. 5 shows another embodiment according to the invention of a filling test device in a diagrammatic three-dimensional representation, whereby, in contrast to FIG. 4 or FIG. 3, two sensors 15 and 15' are provided.

With the variants according to the invention according to FIGS. 3 through 5, a cost-effective solution can be realized. The existing movement of the tray in a machine of the tobacco-processing industry can be used partially or completely in the necessary relative movement of the sensor or the sensors to the trays. With these variants, too, an installation of the filling test device is possible at many locations in a corresponding machine of the tobacco-processing industry.

Figure 6:
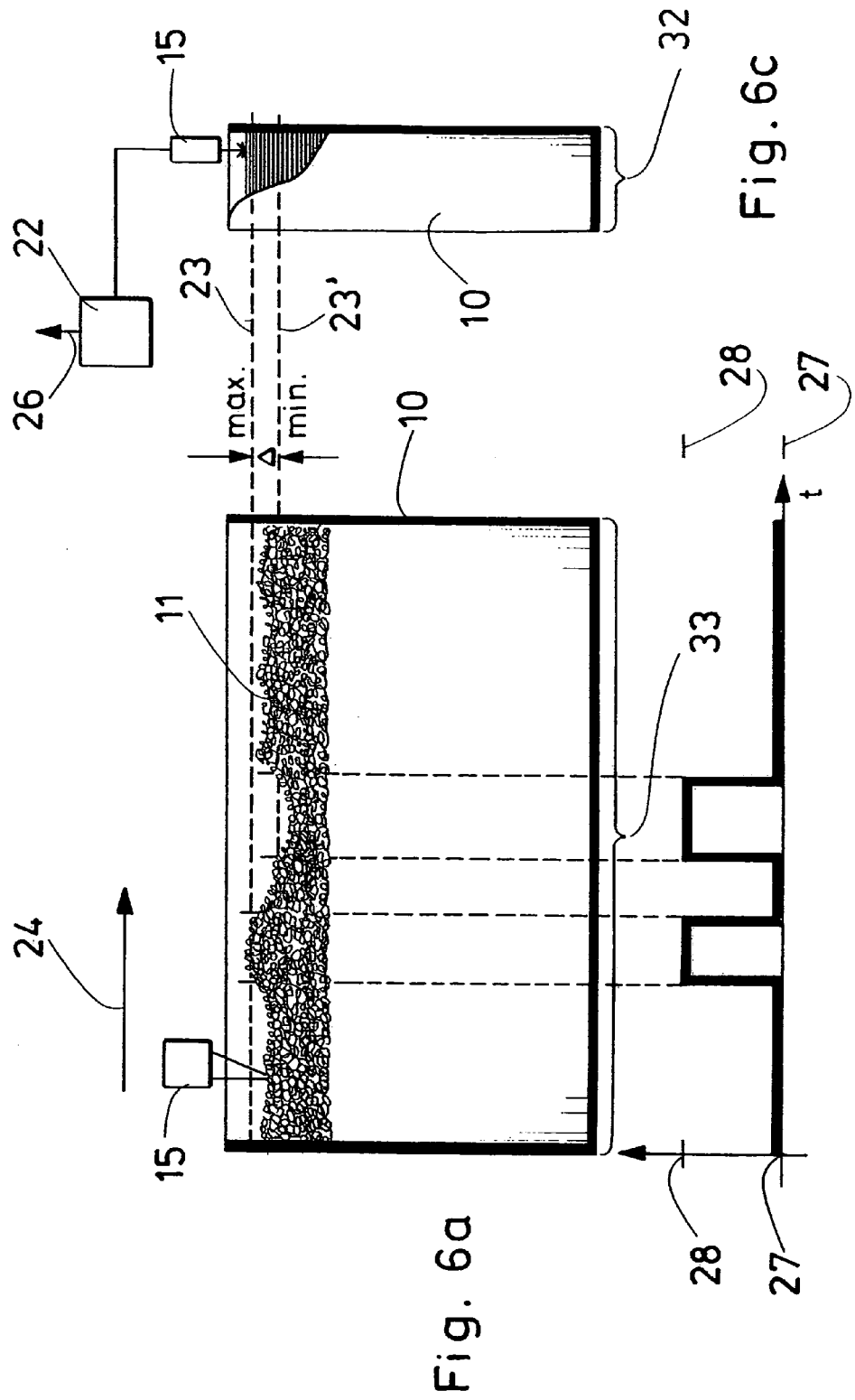

FIG. 6a shows a tray in a diagrammatic side view. Furthermore, a sensor 15 is provided that measures a distance. In this case, the height of the filling of the tray 10 with filter rods 11 is measured. The height of the content of the tray 10 is measured over the travel path 24 across the entire width 33. The broken horizontal lines are the maximum permissible height 23 (max.) and the minimum permissible height 23' (min.). The area between them Δ is the tolerance range between the fullness levels 23 and 23'.

FIG. 6c shows the same tray 10 from another side diagrammatically partially cut away, namely across the depth 32 of the tray 10. The sensor 15 is connected by a cable to an evaluation device 22 that generates a signal 26. If the permissible fullness level 23 is exceeded, a signal is generated that has a value that is labeled by reference number 28 and has a value that is outside the tolerance range. This is shown diagrammatically in FIG. 6b by a signal over time diagram. A corresponding signal 28 is generated when the fullness level falls below the minimum fullness level 23'. This is also shown in FIG. 6b. Otherwise the fullness level is in the tolerance range, i.e., in the range of Δ, so that a signal 27 is generated. With constant speed of the relative movement of the sensor 15 to the tray 10, an inference can be made on the path covered over the time recorded.

The tray shown in FIG. 6a is correspondingly defective and can lead to further errors, so that it should be excluded from the production process. This is because, e.g., if it falls below the fullness level with a 180° rotation of the container 10 for emptying even the product rods can become disarranged in an uncontrolled manner in the container 10. Through this it can happen that the product rods no longer lie parallel in an ordered manner so that a further processing and a further transport are no longer possible.

FIGS. 7a-7c show in different representations another filling test device according to the invention. FIG. 7a is a plan view of a tray 10, above which a part of a corresponding filling test device is arranged. In this case, two laser distance sensor 25 and 25' are arranged next to one another, namely in the direction of the depth of the tray 10. The height signals recorded by the laser distance sensors 25 and 25' are subtracted from one another through an evaluation unit 22, which is shown in FIG. 7c. With a difference or a difference amount that is outside a tolerance range, a signal 26 is generated that is given reference number 28. With a simultaneous method or a simultaneous movement of the two sensors 25 and 25' along the travel path 24, filter rods 11 correspondingly positioned obliquely would be registered very quickly. The sensors 25 and 25' are aligned such that they detect filter rods lying parallel simultaneously. In this exemplary embodiment, too, either the sensors can be moved or the trays.

FIG. 7c shows a section along the line A-A from FIG. 7a. In particular the laser beam 29, 29' of the sensors 25, 25' is also represented, which laser beam hits the product surface or the topmost layers of the products 11, 12 and is recorded by a detector 30 or 30'. The distance of the sensor from the surface can be measured in a simple manner depending on the displacement of the laser dots on the position-sensitive detector 30 or 30'. To this end the principle of triangulation can be used.

In the detection of product rods positioned crosswise, e.g., with two laser distance sensors 25 and 25', a type of distance reference can be formed, in which the distance covered, e.g., by a rotary incremental encoder or another signal is imaged by distance sensors. If therefore a filter rod 11 is positioned crosswise, one of the two laser distance sensors 25, 25' can transmit a start signal, e.g., to a counting unit on detecting a filter rod 11 positioned crosswise, and the second laser distance sensor 25, 25' can send a stop signal. Through this, the distance difference of the two laser distance sensors can be determined, namely via the travel speed of the laser distance sensors or the tray 10 and the recorded time difference, or via the number of impulses with the highest possible resolution (high-resolution with respect to time), that can be used in a triggering of the first and the second laser distance sensor 25 and 25'. The number of impulses counted is then a measure of the absolute angular misalignment of a product rod positioned crosswise. Accordingly, the time difference can also be a measure for this. It can then also be provided to provide an upper limit for the number of trigger impulses or the time or the distance or the angle of the product rod, in order to make a classification of the error of the filling into go and no-go. Depending on the product, the classification can hereby be parametrizable and thus adjustable. An error can thus be output by the system for each filter rod or any other product only from a previously predetermined misalignment angle.

Figure 8:
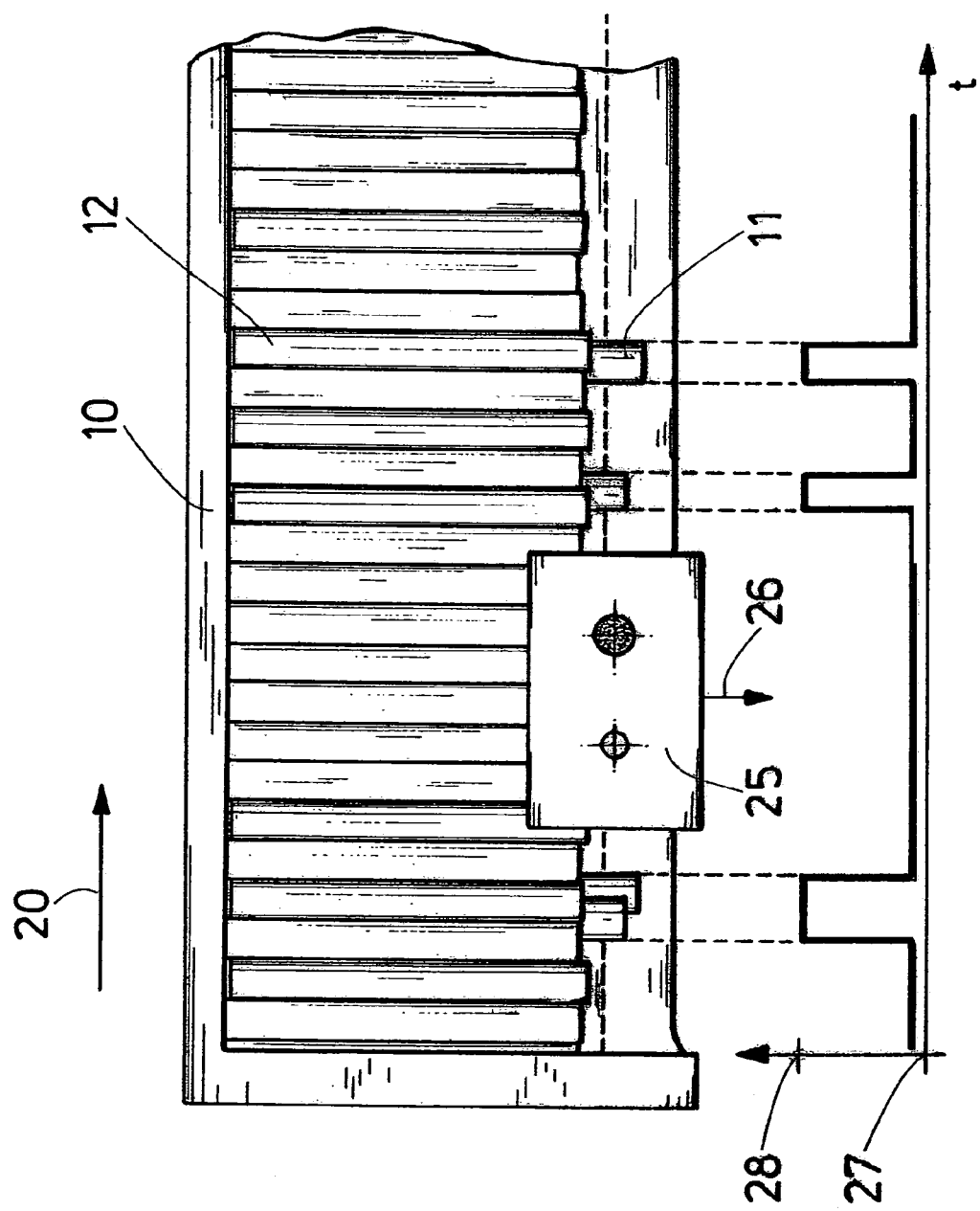
FIG. 8a illustrates a diagrammatic plan view of a part of a tray.
FIG. 8b illustrates a diagrammatic representation of a signal over time diagram.

FIG. 8a shows another embodiment of a filling test device according to the invention or a part thereof. In this case, too, a laser distance sensor 25 in which, e.g., an evaluation unit is integrated, serves as a sensor. The laser distance sensor 25 is used to detect projecting filter rods 11. Through strong movements such as acceleration or geometric arrangements in which the other filter rods 12 lying around a filter rod 11 support one another so that the filter rod 11 lying in the center is not held and thus lies freely, it can occur that a corresponding filter rod 11 "moves out." These filter rods can break off in further handling, so correspondingly projecting filter rods 11 are not desirable.

The diagrammatic plan view of FIG. 8a on a part of a tray 10 that is filled with corresponding filter rods 11 and 12 indicates the measuring method. The sensor 25 is moved along the travel path 20 relative to the tray 10. The height of the sensor to the floor or the filter rod 11 is hereby measured. If the measured distance is different from the distance of the sensor from the floor of the tray 10, a signal 26 is generated that corresponds to a value 28, namely outside the tolerance range. A corresponding diagrammatic diagram of the measured signal over time is shown in FIG. 8b.

Figure 9:
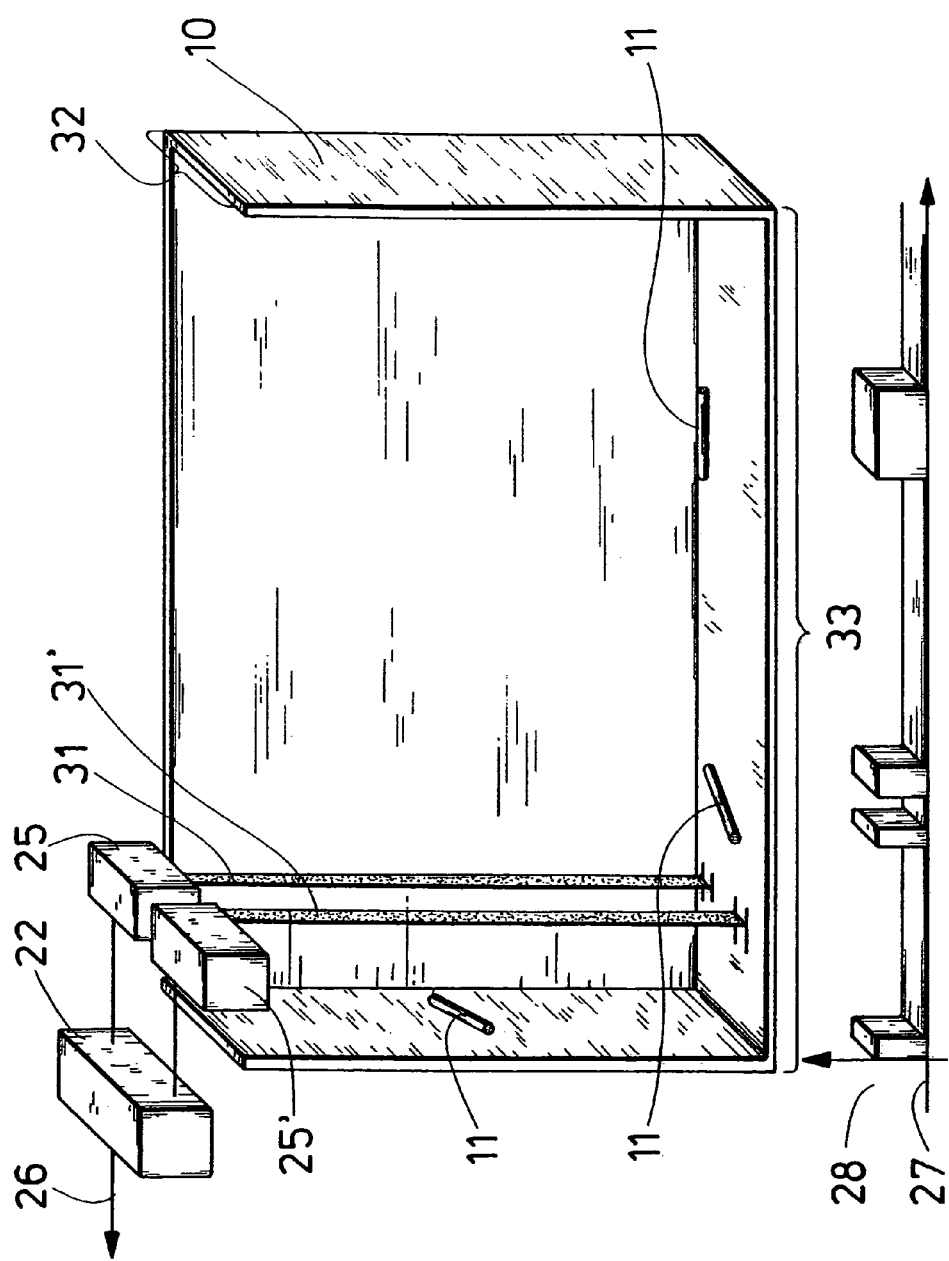
FIG. 9a illustrates a diagrammatic three-dimensional representation of an emptied tray.
FIG. 9b illustrates a diagrammatic representation of a signal over time diagram.

Finally, another filling test device according to the invention in another embodiment is shown diagrammatically in FIG. 9a. The filling test device can hereby be embodied like that according to FIG. 7, whereby in this case a complete emptying of a tray 10 is detected by the laser distance sensors 25 and 25'. A tray 10 not completely emptied can result because through a static charge, adhesive deposit or other materials used in production, such as, e.g., saccharine or product rods 11 that have fallen in and squashed or jammed product rods, these can remain in the interior of the tray. In FIG. 9a three filter rods 11 have remained after emptying, which are correspondingly detected by the laser distance sensors. A diagrammatic signal over time diagram according to FIG. 9b results. The laser beams are hereby preferably fanned out in order to cover a larger area. Since the distance between the sensors 25 and 25' and the tray floor is always the same, any deviation from this distance value is an indication of objects still located in the tray. Two or more sensors 25, 25' can be linked with an OR function in order to monitor the floor area with sufficient reliability.

Figure 7:
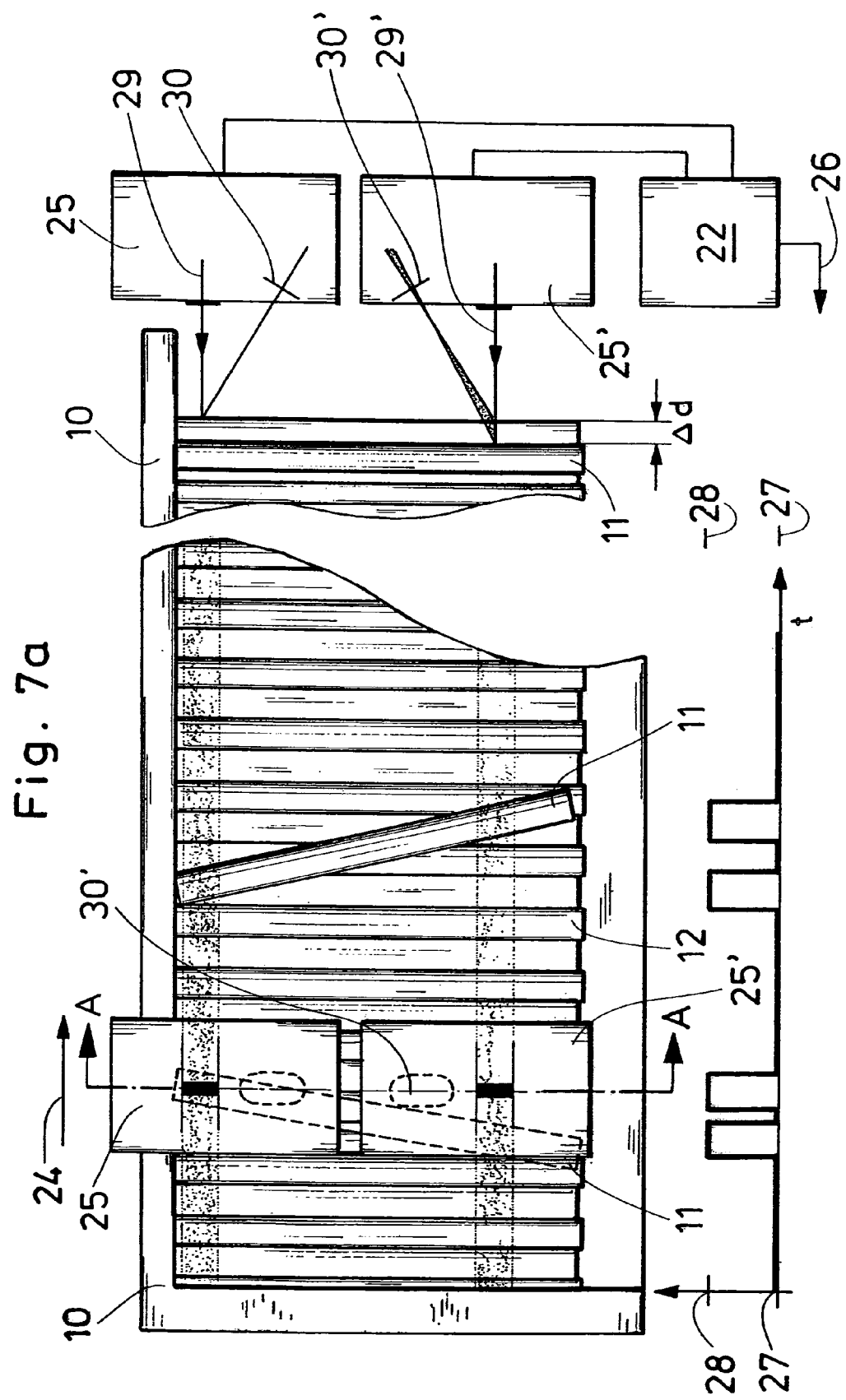

It is particularly preferred or simple if the same sensors 25, and 25' are used as according to the exemplary embodiment of FIG. 7, whereby it is then particularly preferred if the filled tray and the emptied tray are respectively measured or monitored at the same place.

It is also advantageous to use sensors with a specially focused light spot of a specific geometric shape. It is in particular advantageous to embody the geometry of the light spot in a rectangular to linear shape, in order to detect even thin product rods. Another advantage of the line is the possibility of close edge scanning of the tray. In order to conduct the measurements inside the tray, sensors such as, e.g., reflective probes can be used which detect the tray walls. If the tray is moved under the sensor, the reflective probe is adjusted so that a trigger signal is generated when, e.g., the tray side wall is recognized. It is thus ensured that the measurements described above are activated and their signals evaluated only in the area to be monitored.

If an adherence of rod-shaped articles to tray sidewalls can be ruled out, a monitoring of the empty tray floor can be realized with only one sensor. This can preferably be a laser reflex probe. This is preferably arranged such that it monitors at the front the floor surface in the depth for the presence of rod-shaped articles. The container can hereby be moved or the sensor can be moved along the container. In terms of the depth, the tray rear wall is then to be considered as 0 value or zero position or reference distance.

If a cigarette positioned crosswise, a filter rod positioned crosswise or, e.g., a cut filter rod positioned crosswise occurs in the magazine of a filling device of rod-shaped articles, which can occur, e.g., through the removal of cigarettes by an operator in the line of sight, a crosswise positioning in the outlet or a crosswise positioning on a displacing element etc., this settles on the shaker bar belonging to the filling device and ensures that the container, e.g., a tray, is not filled at this point. As a result, the rod-shaped objects or articles in the tray fall into the gap produced and an uncontrolled grouping of cigarettes or filters or rod-shaped articles occurs in this area of the tray.

This filling error shows an accumulation of unordered rod-shaped articles not lying parallel, which are also called "nests." An error of this type has not hitherto been detected by any sensor system. Moreover, each further tray would be poorly filled. The error would, for instance, not be noticed until the first faulty tray is lifted from the lift platform, so that an operator detects the error upon manual handing to shift from the lift platform to the tray wagon or a tray emptying unit sold by the applicant under the name "Magomat." However, in this case ten or more trays have already been filled. If these are standard formats, this is therefore approx. forty thousand rod-shaped articles. In order to monitor this process, cigarette manufacturers have installed a mirror, so that the operator of a cigarette machine or a filter machine can observe the filling process in the mirror. However, this error is nevertheless seldom recognized by an operator in time or at an early stage.

The tray disturbed in its orderly arrangement of the products by such errors should not be guided back to the process in a tray emptying unit such as the "Magomat" sold by the applicant. Some crosswise positionings or rod-shaped articles positioned crosswise in the tray are sufficient in the tray emptying unit to render the entire line inoperative for a time, since the rod-shaped articles can arrange themselves in an uncontrolled and chaotic manner in the magazine of the tray emptying unit, thus causing a considerable disturbance to the further process. This results in long stoppage times through cleaning the machine and extracting poorly filled trays. The poorly filled trays cannot be used for production. This causes a production loss.

This problem is expanded if the tray handling is automated. It is hereby in particular important to recognize errors correspondingly early, since with automation with robots manual monitoring by the operator is regularly omitted.

Figure 10:
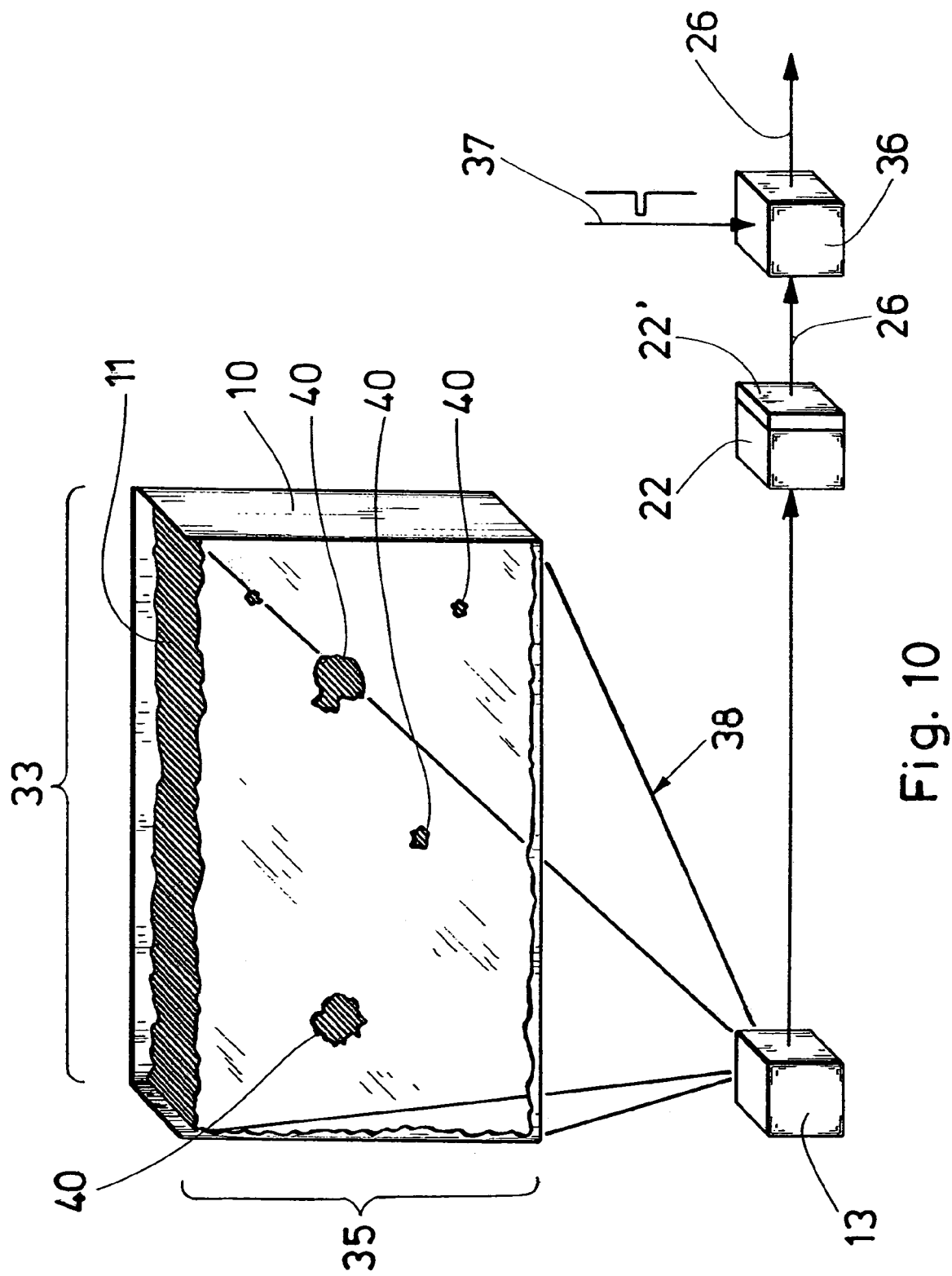
FIG. 10 illustrates a diagrammatic representation of a filing test device according to the invention.

FIG. 10 shows a diagrammatic view of a filling test device according to the invention in which corresponding filling errors exist in the form of nests 40. Corresponding filter rods 11 are arranged in the tray with a height 35 and a width 33. Instead of filter rods 11, these can also be finished cigarettes (with or without filters). An image of the complete front view is taken with a camera 13. Since the filling error with the classification "nests" differs optically from trays filled normally, an error detection is possible according to the invention via a camera system and corresponding illumination device (not shown).

Filling errors in the form of "nests" exhibit greater coherent accumulations of identical gray-scale pixels and can thus be clearly distinguished from images of normally filled trays. There are no corresponding accumulations with normally filled trays 10. These images rather have a more homogenous distribution of black/white pixels. The number of pixels and thus the error area size can be selected via an adjustment or parametrization of the camera system.

In its resolution and focal length the camera system is determined such that it converts the entire front view of the tray 10 into digital image information. To this end, a corresponding detection pyramid 38 and the distance of the camera 13 from the tray 10 or the front view of the tray 10 are adjusted such that the entire front view can be recorded. The recording process can take place statically, thus while the tray or camera is still. Furthermore, it is conceivable to also use this method while the tray is moving, if the tray 10 is moved past the camera 13 at a defined distance or the camera 13 is guided by the tray 10 at a defined distance.

The shot is initiated by a trigger signal by a control, namely at a time at which the object to be observed is in the image area of the camera system. Alternatively to this, the trigger signal 37 can also be provided in order to make the image of the camera available for an evaluation or for the transfer of a corresponding signal 26 only at the moment in which the trigger signal is on a signal that corresponds to a presence the presence of an object to be observed in the image area of the camera 13.

The camera image is fed via preferably an electric lead to an evaluation device 22 that has an evaluation device 22' or a corresponding signal generation unit 22'. The evaluation device 22' or signal generation unit 22', which can be a component of the evaluation device 22, generates a signal 26 that can be a binary signal 1 or 0 or true or false and indicates whether a correctly filled tray is present or in fact a tray that is not correctly filled. The signal 26 is relayed to a control device 36 into which the trigger signal 37 is introduced. The signal 26 is then relayed from the control device 36 if the trigger signal 37 means the presence of a tray in the image area of the camera system. Otherwise, the signal 26 is withheld.

Figure 11:
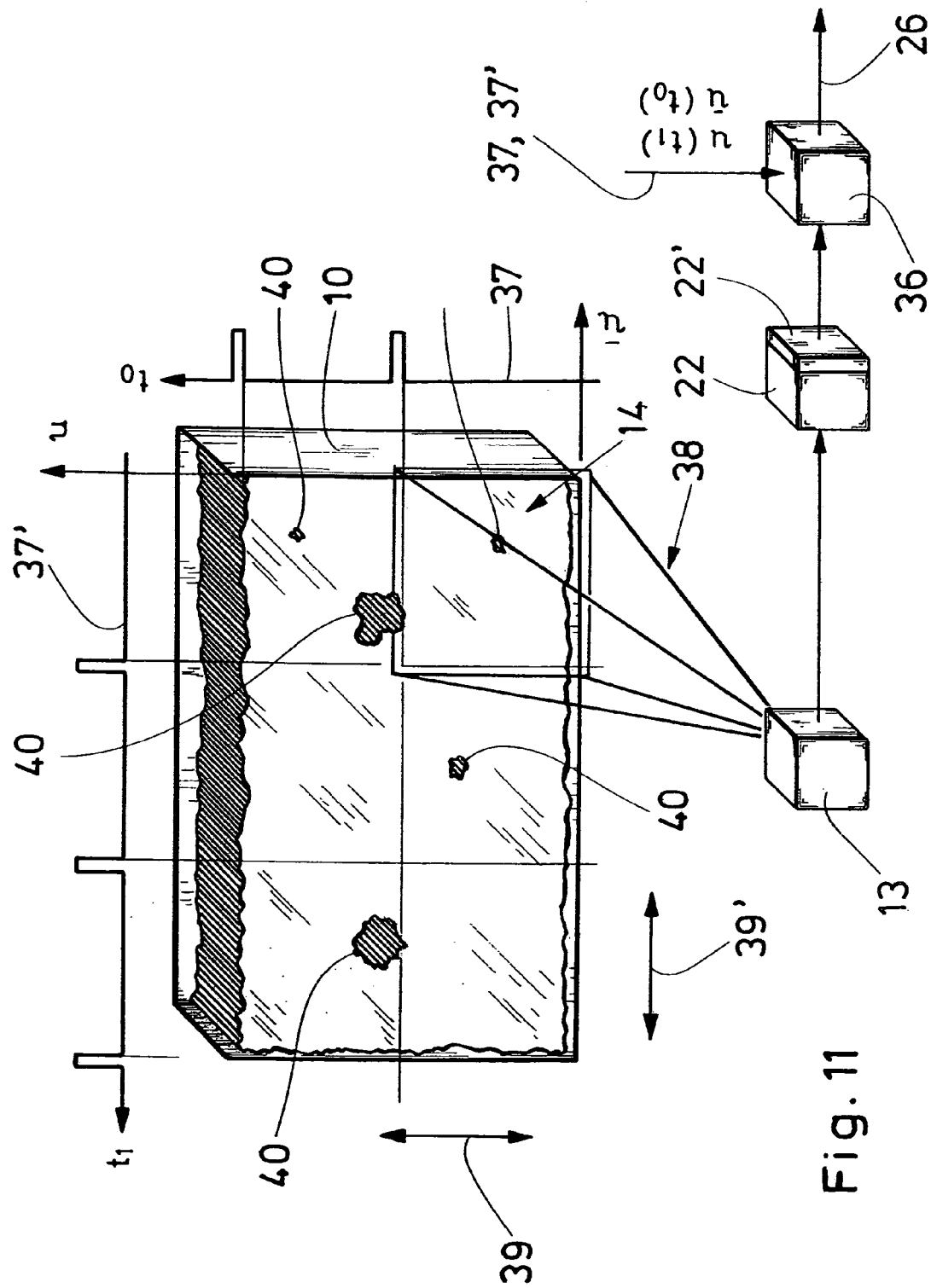
FIG. 11 illustrates a diagrammatic representation of another filling test device according to the invention.

FIG. 11 shows another embodiment of a filling test device according to the invention, whereby, in contrast to FIG. 10, the camera system is embodied in order to image a section of the front view of the tray, which corresponds to only a part of the front view. The camera system 13 or the camera 13 or the tray 10 can then be moved along the travel direction 39 or 39' in order to record the other five sections of the front view of the tray 10. This results in a simplification, since several individual sequential images can be recorded successively. More cost-effective camera systems with lower resolution can be used. A possible overlapping of the images recorded does not lead to a malfunction, since even a single error leads to the exclusion of the tray 10. This means that if it is already established in the first image section that is recorded that an error is present in the filling, the entire tray 10 can be removed without further examination or recording of images. Depending on the image size and necessary resolution or machine surroundings (according to the installation space) several cameras 13 in sequential interconnection can also take over the function of a high-resolution camera system. In FIG. 11 a trigger signal $U(t_1)$ and $\overline{U}(t_0)$ is also provided in order to be able to relay the corresponding signal 26 in the control device 36 at the right moment or in order to make a corresponding evaluation at the right moment. The trigger signal or signals 37, 37' can also be connected to the evaluation device 22 or fed thereto.

Figure 12:
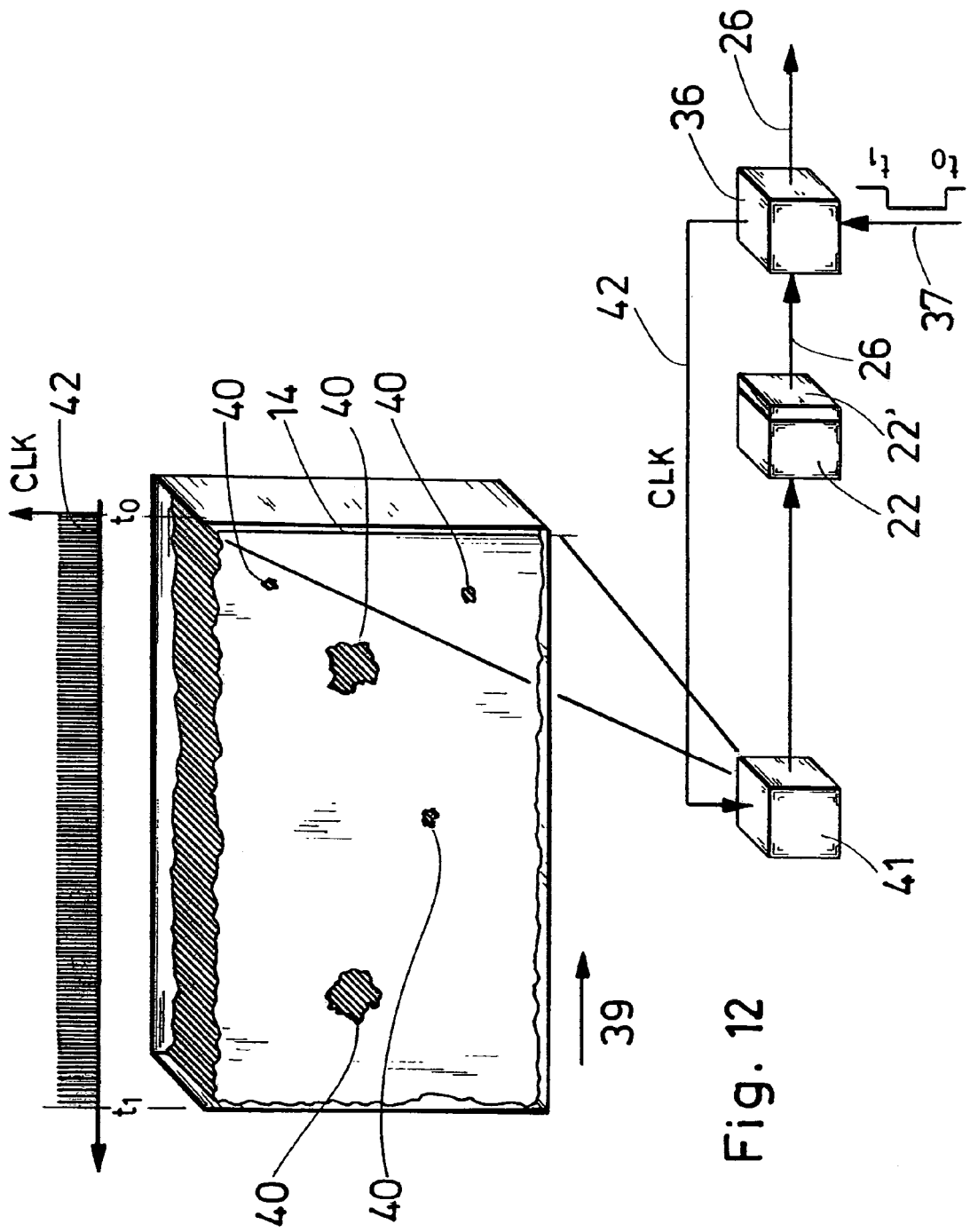
FIG. 12 illustrates another diagrammatic representation of another filing test device according to the invention.
Figure 13:
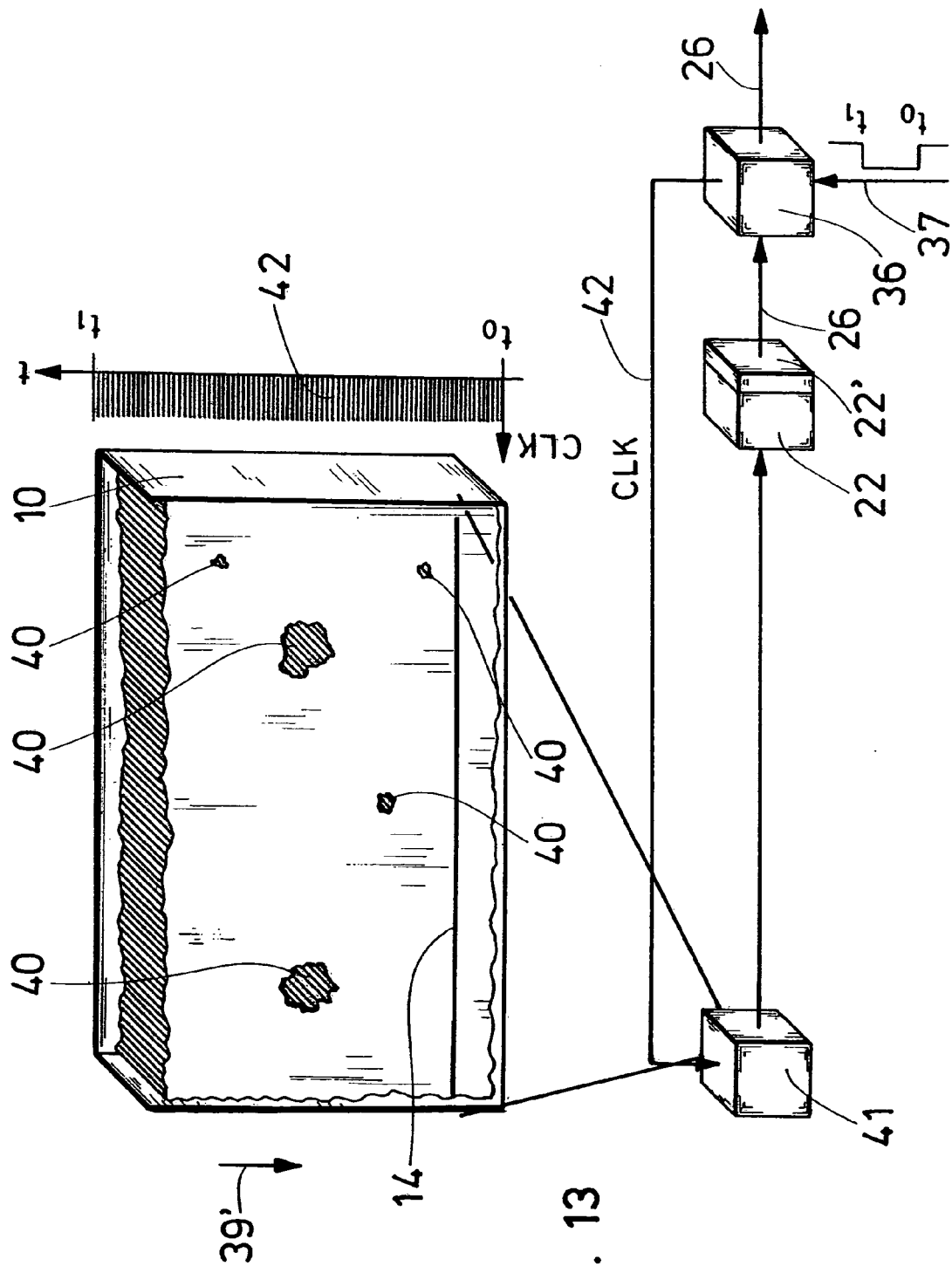
FIG. 13 illustrates another diagrammatic representation of another filing text device according to the invention.

In FIG. 12 another diagrammatic representation of a filling test device according to the invention is discernible. This is a particularly cost-effective embodiment. When the tray 10 is moved at the front vertically or horizontally at a constant speed, in the case of FIG. 12 along the width of the tray 10 and in FIG. 13 along the height, a line camera, e.g. a CCD line (CCD from Charge Coupled Device), can be used. In this case respectively one image line is recorded with a quick clock control (CLK) 42 and tested for nests 40. In FIG. 12 the photo line 41 takes one image per clock or clock signal 42 along the height of the front view of the tray and in FIG. 13 one image along the width. To this end the control device 36 is switched to active by a trigger signal 37 in the period between $t_0$ and $t_1$ and a clock signal 42 is fed to the photo line 41 in order to record corresponding linear images in the period between $t_0$ and $t_1$ at the respective clock signals 42. These are then evaluated for nests 40, namely in the evaluation device 22. If a nest is present, the evaluation device 22' or the signal generation unit 22' generates a signal 26 that corresponds to the existence of a nest or the non-existence of a nest 40.

In order to ensure independence from daylight, preferably the front of the tray is illuminated with infrared light. Accordingly with the other embodiments of the invention infrared light can also illuminate the top of the tray or the per se emptied trays. An optical barrier filter can then be installed on the camera lens so that the spectral color portion of daylight can be eliminated. In order to obtain the best possible contrast between good and bad filling, preferably an oblique arrangement of the illumination of the front of the tray is to be selected, i.e., the infrared light is radiated at an angle in the range of 45° to 89° to the perpendicular of the front view of the tray 10 or to the perpendicular of the top of the tray 10 for the detection of filling errors in a plan view of the tray 10. The illumination can be switched on only for the duration of the camera shot in order to increase the life of the illumination device. Moreover, expediently a status light should indicate the operating condition of the source of infrared light so that the operator of the machine notices when the source of infrared light is illuminated.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

10 Tray
11 Filter rod
12 Filter rod
13 Camera
14 Detection zone
15, 15' Sensor
16 Carriage
17 Rail
18 Motor
20, 20", 20''' Travel path
21, 21' Rail
22 Evaluation device
22' Signal generation unit
23, 23" Fullness level
24 Travel path
25, 25' Laser distance sensor
26 Signal
27 In the tolerance range 28 Outside the tolerance range
29, 29' Laser beam
30, 30' Detector
31, 31' Laser beam
32 Container depth
33 Container width
34 Container tipping device
35 Container height
36 Control device
37, 37' Trigger signal
38 Detection pyramid
39, 39' Travel direction
40 Nest
41 Photo line
42 Clock signal

What is claimed:

1. A method for testing the filling of a tray with rod-shaped articles of the tobacco-processing industry, in which a depth of the tray is at least as great as a length of a rod-shaped article, the process comprising:
   detecting at least one property of the content of the tray;
   comparing the at least one property with a predetermined desired content of the tray; and
   when a deviation from the desired content is greater than a predetermined tolerance value, generating a signal corresponding to a defective filling,
   wherein the at least one property comprises a fullness level of the tray, and the process further comprises detecting the fullness level of the tray from above the articles.

2. The method in accordance with claim 1, wherein at least one upper layer of the articles in the tray is tested for articles positioned crosswise.

3. The method in accordance with claim 2, wherein, before the detection of the at least one upper layer of the articles in the tray, the container tray is tilted.

4. The method in accordance with claim 1, wherein at least one upper layer of the articles in the tray is tested for articles positioned obliquely to an intended orientation.

5. The method in accordance with claim 1, wherein portions of articles projecting from the content of the tray are detected.

6. The method in accordance with claim 1, wherein articles remaining in the tray after the tray has been emptied are detected.

7. The method in accordance with claim 1, wherein the detecting comprises recording an optical image by camera, and the comparing comprises comparing the optical image to a desired image.

8. The method in accordance with claim 1, wherein the detecting comprises recording a line orientation by a contrast image.

9. The method in accordance with claim 1, wherein the detecting comprises detecting a signal pattern over a width of the tray, and the comparing comprises comparing the signal pattern with one of a stored signal pattern or another detected signal pattern.

10. The method in accordance with claim 9, wherein the signal pattern is detected by a sensor.

11. The method in accordance with claim 9, wherein the signal pattern is detected by one of an ultrasonic probe and an optical probe.

12. The method in accordance with claim 1, wherein at least one laser distance sensor is used.

13. The method in accordance with claim 12, wherein the laser distance sensor records a signal pattern across a width of the tray.

14. The method in accordance with claim 12, wherein the at least one laser distance sensor comprises two laser distance sensors arranged next to one another to be essentially perpendicular to a width of the tray, and the process further comprises subtracting the distances detected with the laser distance sensors at predetermined times from one another.

15. The method in accordance with claim 1, wherein at least one sensor moves relative to the tray.

16. The method in accordance with claim 15, wherein the at least one sensor moves across a width of the tray.

17. The method in accordance with claim 15, wherein the tray moves through a detection zone of the at least one sensor.

18. A filling test device for tray s for receiving rod-shaped articles of the tobacco-processing industry, comprising:
   a recording device for recording at least one property of a content of the tray;
   an evaluation device comprising a signal generator unit, the evaluation device being structured and arranged to compare the at least one property of the content of the tray with a desired content of the tray wherein the at least one property comprises a fullness level of the tray; and
   the signal generation unit being structured and arranged to generate an error signal when a deviation from the desired content is present and greater than a predetermined tolerance value,
   wherein the recording device is arranged above the tray.

19. The filling test device in accordance with claim 18, wherein the recording device comprises at least one camera structured and arranged to record at least one of: at least one section of a front, top, or plan view of the tray and the rod-shaped articles located in the tray.

20. The filling test device in accordance with claim 18, wherein the recording device comprises a photo line, and at least one of the photo line and the tray is structured and arranged to be moveable.

21. The filling test device in accordance with claim 18, wherein the recording device comprises at least one sensor structured and arranged to record a signal pattern along at least one of a width and a height of the tray, and evaluation device comprises a storage device to store at least one signal pattern to be compared to recorded the signal pattern.

22. The filling test device in accordance with claim 21, wherein the at least one sensor is moveable on a carriage arranged essentially parallel to the width of the tray.

23. The filling test device in accordance with claim 21, wherein the at least one sensor is movable crosswise to the travel direction.

24. The filling test device in accordance with claim 21, wherein the at least one sensor comprises a distance sensor.

25. The filling test device in accordance with claim 24, wherein the distance sensor comprises a laser distance sensor.

26. The filling test device in accordance with claim 21, wherein the at least one sensor comprises one of a reflective probe, laser reflex probe or an ultrasonic probe.

27. The filling test device in accordance with claim 21, wherein the at least one sensor comprises an optical camera.

28. The filling test device in accordance with claim 18, further comprising a tray tipping device.

* * * * *